United States Patent
Kashima et al.

(10) Patent No.: US 11,261,354 B2
(45) Date of Patent: Mar. 1, 2022

(54) ADHESIVE RESIN COMPOSITION, FILM FOR FLUORINE RESIN ADHESION, LAMINATE, AND METHOD FOR PRODUCING LAMINATE

(71) Applicant: FUJIMORI KOGYO CO., LTD., Tokyo (JP)

(72) Inventors: Kousuke Kashima, Tokyo (JP); Takeo Matsuyama, Tokyo (JP); Toyoaki Suzuki, Tokyo (JP); Hidekazu Furukawa, Tokyo (JP)

(73) Assignee: FUJIMORI KOGYO CO., LTD., Tokyo (JP)

( * ) Notice: Subject to any disclaimer, the term of this patent is extended or adjusted under 35 U.S.C. 154(b) by 202 days.

(21) Appl. No.: 16/467,498

(22) PCT Filed: Nov. 30, 2017

(86) PCT No.: PCT/IB2017/001474
§ 371 (c)(1),
(2) Date: Jun. 7, 2019

(87) PCT Pub. No.: WO2018/109547
PCT Pub. Date: Jun. 21, 2018

(65) Prior Publication Data
US 2019/0322908 A1    Oct. 24, 2019

(30) Foreign Application Priority Data
Dec. 12, 2016 (JP) .............................. JP2016-240272

(51) Int. Cl.
| | | |
|---|---|---|
| C09J 123/06 | (2006.01) | |
| B32B 7/12 | (2006.01) | |
| B32B 27/08 | (2006.01) | |
| B32B 27/32 | (2006.01) | |
| B32B 37/12 | (2006.01) | |
| B32B 37/15 | (2006.01) | |
| C09J 5/00 | (2006.01) | |
| C09J 11/08 | (2006.01) | |
| C09J 121/00 | (2006.01) | |

(52) U.S. Cl.
CPC .............. *C09J 123/06* (2013.01); *B32B 7/12* (2013.01); *B32B 27/08* (2013.01); *B32B 27/322* (2013.01); *B32B 27/327* (2013.01); *B32B 37/12* (2013.01); *B32B 37/153* (2013.01); *C09J 5/00* (2013.01); *C09J 11/08* (2013.01); *C09J 121/00* (2013.01); *C09J 2409/00* (2013.01); *C09J 2423/04* (2013.01); *C09J 2427/006* (2013.01)

(58) Field of Classification Search
CPC ...... C09J 123/04; C09J 121/00; C09J 123/06; C09J 2409/00; C09J 2423/04; C09J 5/00; B32B 37/12; B32B 7/12; B32B 27/00; B32B 27/08; B32B 27/322
See application file for complete search history.

(56) References Cited

U.S. PATENT DOCUMENTS

| | | | | |
|---|---|---|---|---|
| 4,675,356 A | * | 6/1987 | Miyata | ...................... C08K 3/26 524/395 |
| 5,234,524 A | | 8/1993 | Ozu et al. | |
| 6,001,205 A | | 12/1999 | Mauro | |
| 8,865,824 B2 | | 10/2014 | Bunnelle | |
| 2010/0256304 A1 | * | 10/2010 | Bernreitner | ............. C08L 23/10 525/232 |
| 2016/0068717 A1 | | 3/2016 | Gasa et al. | |

FOREIGN PATENT DOCUMENTS

| | | | | |
|---|---|---|---|---|
| CN | 1320140 A | 10/2001 | | |
| EP | 0484053 A1 | 5/1992 | | |
| EP | 1153974 A1 | * 11/2001 | .............. C08L 23/02 | |
| EP | 1153974 A1 | 11/2001 | | |
| JP | H04-161334 A | 6/1992 | | |
| JP | H10-176144 A | 6/1998 | | |

(Continued)

OTHER PUBLICATIONS

Nippon Soda JP-100 Datasheet, Jun. 2016, downloaded from https://polymer-additives.specialchem.com/product/a-nippon-soda-nisso-pb-jp-100 on May 8, 2021.*
International Preliminary Report on Patentability dated Jun. 18, 2019 for PCT/IB2017/001474 and English translation thereof; 11 pgs.
Notice of Allowance for Singapore Patent Application No. 11201905107T dated Feb. 18, 2020; 7 pgs.

(Continued)

*Primary Examiner* — Philip C Tucker
*Assistant Examiner* — Jimmy R Smith, Jr.
(74) *Attorney, Agent, or Firm* — Hauptman Ham, LLP

(57) ABSTRACT

The present invention provides an adhesive resin composition that is used for adhesion of a fluorine-based resin and is aimed at adhesion between fluorine-based resins or between a fluorine-based resin and a material other than a fluorine-based resin. More specifically, the present invention relates to an adhesive resin composition for use in adhesion of a fluorine-based resin, the composition including a polyethylene-based resin, an elastomer component, and a component having an epoxy group and a vinyl group, wherein a content of the polyethylene-based resin is 55 parts by mass or more and 90 parts by mass or less, a content of the elastomer component is 10 parts by mass or more and 45 parts by mass or less, the elastomer component and the component having an epoxy group and a vinyl group have a common repetition unit, and a content of the component having an epoxy group and a vinyl group based on a total amount of 100 parts by mass of the polyethylene-based resin and the elastomer component is 0.1 parts by mass or more and 1.5 parts by mass or less.

5 Claims, 1 Drawing Sheet

(56) References Cited

FOREIGN PATENT DOCUMENTS

| JP | 2000-015754 A | 1/2000 |
|---|---|---|
| JP | 2000-103914 A | 4/2000 |
| JP | 2003-063226 A | 3/2003 |
| JP | 2003-064226 A | 3/2003 |
| JP | 2005-238469 A | 9/2005 |
| JP | 2008-133391 A | 6/2008 |
| JP | 2014-218633 A | 11/2014 |
| JP | 2015-117281 A | 6/2015 |
| JP | 2015532936 A | 11/2015 |
| JP | 2016088916 A | 5/2016 |
| JP | 2016-526077 A | 9/2016 |
| KR | 10-2014-0097750 A | 8/2014 |

OTHER PUBLICATIONS

Extended European Search Report for European Patent Application No. 17879996.1 dated Apr. 3, 2020; 9 pgs.

Office Action for Japanese Patent Application No. 2016-240272 dated Dec. 1, 2020 with English translation, 4 pgs.

Office Action for Chinese Patent Application No. 201780075483.3 dated Jan. 25, 2021 with English summary, 4 pgs.

Office Action for Indian Patent Application No. 201917022587 dated Jan. 29, 2021, 6 pgs.

International Search Report dated Mar. 13, 2018 for PCT/IB2017/001474 and English translation, 5 pages.

Notice of Allowance for Korean Patent Application No. 10-2019-7015733 dated Mar. 18, 2021 with English Translation, 5 pgs.

Notice of Allowance for Chinese Patent Application No. 201780075483.3 dated Apr. 7, 2021 with English Translation, 4 pgs.

Office Action for Chinese Patent Application No. 201780075483.3 dated Sep. 14, 2020 and English translation thereof; 9 pgs.

Office Action for Korean Patent Application No. 10-2019-7015733 dated Sep. 15, 2020 and English translation thereof; 10 pgs.

Notice of Allowance in Corresponding Japanese Patent Application No. 2016-240272 dated Jun. 8, 2021; 5 pgs.

Patent Certificate in corresponding Indian Patent Application No. 201917022587 dated Aug. 25, 2021, 1 pg.

Office Action in corresponding European Patent Application No. 17879996.1 dated Oct. 25, 2021, 4 pgs.

* cited by examiner

ADHESIVE RESIN COMPOSITION, FILM FOR FLUORINE RESIN ADHESION, LAMINATE, AND METHOD FOR PRODUCING LAMINATE

CROSS REFERENCE TO RELATED APPLICATION

This application is a National Phase of PCT/IB2017/001474 filed on Nov. 30, 2017, which, in turn, claimed the priority of Japanese Patent Application No. 2016-240272 which was filed on Dec. 12, 2016.

TECHNICAL FIELD

The present invention relates to an adhesive resin composition, a film for fluorine-based resin adhesion, a laminate, and a method for manufacturing the laminate.

BACKGROUND TECHNOLOGY

A film laminate having a high barrier property is used in packing materials for foods, medicaments, and the like. For example, Patent Document 1 describes an adhesive resin composition comprising a modified polyolefin obtained by radically polymerizing an acrylic ester having an epoxy group or a derivative thereof, a polyolefin, and an aromatic vinyl monomer during melt-kneading, a polyethylene having a density of 0.940 $g/cm^3$ or less, and a styrene-based thermoplastic elastomer.

Patent Document 2 describes an adhesive resin composition comprising a polyolefin-based resin, a compound having an intramolecular unsaturated bond, and an epoxy compound.

Patent Document 3 describes a resin composition for extrusion lamination, the resin composition comprising an ethylene-based polymer and an epoxy-modified diene copolymer that is liquid at 25° C.

Patent Document 4 describes a laminate including a resin composition comprising an olefin-based resin, a rubber-like polymer, and an acrylic graft copolymer, the resin composition having adhesiveness with an olefin-based resin layer and a fluorine-based resin layer and being suitable for use in coextrusion molding.

DOCUMENTS OF RELATED ART

Patent Documents

Patent Document 1: Japanese Unexamined Patent Application, First Publication No. 2015-117281
Patent Document 2: Japanese Unexamined Patent Application, First Publication No. 2000-103914
Patent Document 3: Japanese Unexamined Patent Application, First Publication No. 2003-063226
Patent Document 4: Japanese Unexamined Patent Application, First Publication No. 2000-015754

SUMMARY OF THE INVENTION

Problem to be Solved by the Invention

However, in the technology described in Patent Document 1, since melt-kneading is performed in the presence of a radical polymerization initiator, the initiator remains in a finally produced adhesive resin composition. For this reason, there is a possibility that, when the adhesive resin composition is stored for a long term, the property of the resin itself greatly changes.

Moreover, in Patent Document 1, an epoxy group is partially introduced into the resin by polymerization. In this case, if the temperature is not in the vicinity of the melting temperature of the resin, the adhesiveness of the resin does not appear. For this reason, there is a problem that under a lower temperature condition or in a short time, the adhesiveness required in uses demanding adhesion and fusion is not obtained.

In the technology described in Patent Document 2, an epoxidized vegetable oil is used as an epoxy compound. The fatty acid described in Patent Document 2, such as linolenic acid that is the main component of soybean oil or linoleic acid that is the main component of linseed oil, has a molecular weight of about several hundreds. For this reason, there is a problem that when the disclosed adhesive resin composition is made into a film, the oil immediately bleeds out and the adhesion failure is easily caused.

In the technology described in Patent Document 3, the ethylene-based polymer accounts for 98.5 to 99.9 parts by mass. For this reason, since the adhesiveness to polypropylene is poor, there is a problem that the disclosed resin composition cannot be used as an adhesive resin for extrusion lamination on a polypropylene substrate and for coextrusion with polypropylene.

In addition to the above, there is a problem that the adhesive resins described in Patent Documents 1 to 3 all have insufficient adhesiveness with a fluorine-based resin.

In the technology described in Patent Document 4, although the disclosed resin composition has adhesiveness with a fluorine-based resin or an olefin-based resin, it is prepared by reacting a modified olefin polymer having a functional group including a carboxylic acid group or a group of an anhydride thereof, an epoxy group, a hydroxy group or an isocyanate group with a radically-polymerizable monomer. For this reason, for example, since a group reactive with an engineering plastic-based resin having an amino group, a carboxyl group or a hydroxy group does not exist at an end of a resin such as a polyamide-based resin and a polyester-based resin, there is a problem that the adhesiveness with them is greatly reduced.

The present invention has been made in view of the above-mentioned circumstances, and an object of the present invention is to provide an adhesive resin composition that is used for adhesion with a fluorine-based resin and is aimed at adhesion between fluorine-based resins or between a fluorine-based resin and a material other than a fluorine-based resin.

Means for Solving the Problem

That is, the present invention has adopted the following constituents.
[1] An adhesive resin composition for use in adhesion of a fluorine-based resin, the composition comprising a polyethylene-based resin (A), an elastomer component (B), and a component (C) having an epoxy group and a vinyl group, wherein
a content of the polyethylene-based resin (A) is 55 parts by mass or more and 90 parts by mass or less,
a content of the elastomer component (B) is 10 parts by mass or more and 45 parts by mass or less, and
a content of the component (C) having an epoxy group and a vinyl group based on a total amount of 100 parts by mass of the polyethylene-based resin (A) and the elastomer component (B) is 0.1 parts by mass or more and 1.5 parts by mass or less.

[2] The adhesive resin composition according to [1], wherein the component (C) having an epoxy group and a vinyl group is a component having an epoxy group partially introduced into 1,2-polybutadiene, and has a number average molecular weight of 500 or more and 4,000 or less.

[3] The adhesive resin composition according to [1] or [2], wherein the elastomer component (B) is a styrene-ethylene-butylene-styrene copolymer having a styrene content of 8% by mass or more and 24% by mass or less.

[4] The adhesive resin composition according to any one of [1] to [3], wherein the polyethylene-based resin (A) is a polyethylene polymerized with a metallocene-based catalyst.

[5] A film for fluorine-based resin adhesion having a single layer configuration, which is formed from the adhesive resin composition according to any one of [1] to [4].

[6] A laminate having a layer formed from the adhesive resin composition according to any one of [1] to [4].

[7] A method for manufacturing the laminate according to [6], the method being any one of methods (1) to (3) below:

(1) a method for manufacturing the laminate, the method comprising steps of:

melt-extruding a layer formed from the adhesive resin composition to obtain a film for fluorine-based resin adhesion having a single layer configuration; and laminating a film on both sides of the film for fluorine-based resin adhesion, followed by thermo-compression bonding to obtain a laminate;

(2) a method for manufacturing the laminate, the method comprising steps of:

melt-extruding a layer formed from the adhesive resin composition on a film serving as a first substrate to obtain a laminate of first substrate/adhesive agent layer; and further laminating a second substrate so as to have first substrate/adhesive agent layer/second substrate, followed by thermo-compression bonding to obtain a laminate; and (3) a method for manufacturing the laminate, the method comprising a step of simultaneously melt extrusion-molding a resin serving as a raw material of a first substrate, the adhesive resin composition, and a resin serving as a raw material of a second substrate.

Effects of Invention

The present invention can provide an adhesive resin composition that is used for adhesion of a fluorine-based resin and is aimed at adhesion between fluorine-based resins or between a fluorine-based resin and a material other than a fluorine-based resin.

BEST MODE FOR CARRYING OUT THE INVENTION

Figure 1:
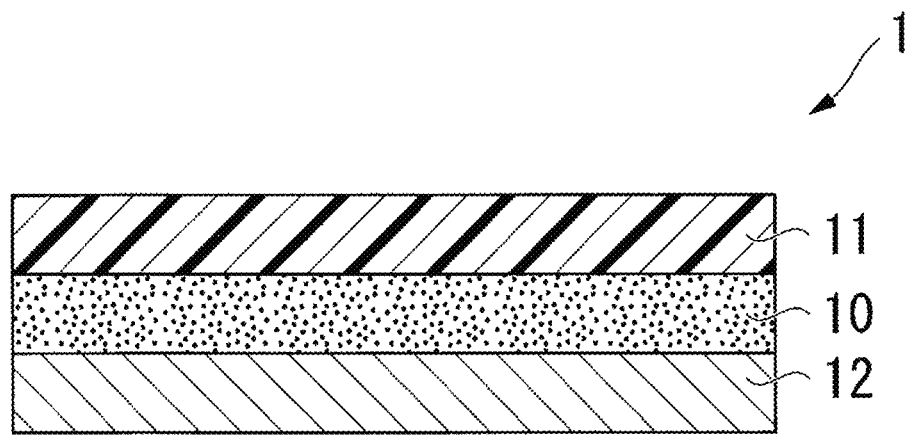
FIG. 1 is a schematic cross-sectional view of a laminate according to the present invention.

The present invention will be described below based on preferred embodiments.

<Adhesive Resin Composition>

An adhesive resin composition according to the present invention is used for adhesion of a fluorine-based resin. For example, the adhesive resin composition can be suitably used in adhesion between fluorine-based resin films when those films are laminated or adhesion between a fluorine-based resin film and a resin film other than a fluorine-based resin when those films are laminated.

The adhesive resin composition of the present invention contains a polyethylene-based resin (A) (hereinafter may be referred to as "component (A)"), an elastomer component (B) (hereinafter may be referred to as "component (B)"), and a component (C) having an epoxy group and a vinyl group (hereinafter may be referred to as "component (C)").

In addition, in the adhesive resin composition of the present invention, a content of the component (A) is 55 parts by mass or more and 90 parts by mass or less, and a content of the component (B) is 10 parts by mass or more and 45 parts by mass or less.

Furthermore, a content of the component (C) based on a total amount of 100 parts by mass of the component (A) and the component (B) is 0.1 parts by mass or more and 1.5 parts by mass or less.

Each component will be specifically described below.

<<Component (A)>>

The polyethylene-based resin used in the present embodiment is not particularly limited, but any one or two or more kinds selected from the group consisting of a linear low density polyethylene (LLDPE), a low density polyethylene (LDPE), a medium density polyethylene (MDPE), and a high density polyethylene (HDPE) are preferable. The polyethylene-based resin may be any of biomass polyethylene, petroleum-derived polyethylene, or a mixture of both of them.

In the present embodiment, the polyethylene-based resin is preferably a polyethylene polymerized with a metallocene-based catalyst. In particular, ethylene-α olefin copolymers such as C4-LLDPE, C6-LLDPE, and C8-LLDPE, a long chain branched polyethylene, and the like which are polymerized with a metallocene-based catalyst are preferred examples.

The polyethylene-based resin polymerized with a metallocene-based catalyst tends to have a narrow molecular weight distribution. For this reason, a low-molecular component that can be an adhesion inhibitory factor is small in quantity, and it is considered that when the polyethylene-based resin is used as an adhesive agent, high adhesiveness is obtained.

A density of the polyethylene-based resin is preferably 0.890 g/cm$^3$ or more and 0.940 g/cm$^3$ or less, and more preferably 0.910 g/cm$^3$ or more and 0.930 g/cm$^3$ or less.

A content of the component (A) in an adhesive agent composition is 55 parts by mass or more and 90 parts by mass or less, and preferably 60 parts by mass or more and 80 parts by mass or less.

When the content of the component (A) is not more than the above-mentioned upper limit value, pressure-sensitive adhesiveness with the component (B) described below is exerted, and adhesiveness becomes high.

<<Component (B)>>

In the present embodiment, as the elastomer component, any component having a property as an elastomer may be used, and examples thereof include a styrene-based elastomer, an acrylic-based elastomer, a urethane-based elastomer, an ester-based elastomer, and the like. Provided that the component (C) described later is excluded from the component (B).

In particular, a styrene-based elastomer is preferable, and examples thereof include block copolymers having a hard segment including polystyrene or the like and a soft segment including polyethylene, polybutadiene, polyisoprene or the like. Examples of a styrene-based polymer usable in the styrene-based elastomer include copolymers of aromatic olefin-aliphatic olefin such as a styrene-butadiene copolymer, a styrene-isoprene copolymer, and a styrene-ethylene copolymer.

In the present embodiment, it is preferable that the styrene-based elastomer is a styrene-ethylene-butylene-styrene copolymer (SEBS) in which intramolecular unsaturated bonds of a styrene-butylene-styrene copolymer (SBS) have been completely hydrogenated.

In addition, a styrene content of the styrene-based elastomer is preferably 8% by mass or more and 24% by mass or less, and more preferably 10% by mass or more and 20% by mass or less.

When the styrene content is not more than the above-mentioned upper limit value, curing of the resin can be suppressed, and reduction in adhesiveness can also be suppressed.

In the present embodiment, examples of the component (B) include DYNARON from JSR Corporation, Tuftec H series from Asahi Kasei Chemicals Corporation, Kraton G polymers from Kraton Polymer Co., Ltd., and the like.

A content of the component (B) in the adhesive agent composition is 10 parts by mass or more and 45 parts by mass or less, and preferably 20 parts by mass or more and 40 parts by mass or less.

When the content of the component (B) is not more than the above-mentioned upper limit value, reduction in tensile strength when an adhesive agent layer is formed can be suppressed, and reduction in adhesion strength can be prevented.

In the present embodiment, the total of the above-mentioned component (A) and the above-mentioned component (B) is set to 100 parts by mass.

<<Component (C)>>

In the present embodiment, the component (C) is a component having an epoxy group and a vinyl group. The component (C) preferably has a 1,2-vinyl structure, and is preferably an epoxydized polybutadiene in which butadiene is partially epoxydized. 1,2-Polybutadiene that is partially epoxydized is particularly preferable.

Examples of the component (C) usable in the present embodiment include liquid polybutadiene JP-100, JP-200 from NIPPON SODA CO., LTD., Adekacizer BF-1000 from ADEKA CORPORATION, and the like.

A number average molecular weight of the component (C) is preferably 500 or more and 4,000 or less.

When the number average molecular weight of the component (C) is not more than the above-mentioned upper limit value, reduction in pressure-sensitive adhesiveness due to a solid state at ambient temperature can be suppressed, and reduction in adhesiveness can be prevented.

In the present invention, the number average molecular weight is a value in terms of polystyrene measured by gel permeation chromatography (GPC).

Furthermore, it is preferable that a liquid epoxydized polybutadiene is used as the component (C).

In the present embodiment, a content of the component (C) based on the total amount of 100 parts by mass of the above-mentioned component (A) and the above-mentioned component (B) is 0.1 parts by mass or more and 1.5 parts by mass or less, and preferably 0.5 parts by mass or more and 1.0 part by mass or less.

When the content of the component (C) is not more than the above-mentioned upper limit value, a low-molecular component that is an adhesion inhibitory factor in the adhesive agent composition can be reduced.

In the present embodiment, it is desirable that the above-mentioned component (B) and the component (C) have a common repetition unit, and are mutually compatible. The component (B) and the component (C) are preferably a combination of styrene-based elastomers or acrylic-based elastomers.

The adhesive resin composition of the present invention is characterized in that the component (A), the component (B), and the component (C) are mixed at a specific blending ratio.

In the adhesive resin composition of the present invention, the epoxy group in the component (C) is compatible with a fluorine component of the fluorine-based resin, and the composition adheres to the fluorine-based resin. When the composition has an epoxy group, adhesion with a metal material becomes also possible. In the present invention, the component (A), the component (B), and the component (C) are mixed at a specific blending ratio, so that a so-called sea-island structure in which the component (A) corresponds to a "sea" and the component (B) corresponds to an "island" is formed, and the component (C) is compatible with the component (B), so that the component (C) can be uniformly dispersed in the adhesive resin composition. It is considered that this makes the epoxy group in the component (C) protected with the component (A) and the component (B), and ring opening of the epoxy group due to moisture is suppressed. For this reason, the present invention can provide an adhesive resin composition also excellent in a water vapor barrier property.

<Film for Fluorine-Based Resin Adhesion>

The present invention provides a film for fluorine-based resin adhesion and a laminate, which are formed from the above-mentioned adhesive resin composition.

The film for fluorine-based resin adhesion of the present invention is a film having a single layer configuration, which is formed from the above-mentioned adhesive resin composition. In the present embodiment, the "film" is a plate-like molded body that can be molded by melt molding and that has an expanse in a surface direction, and includes from a molded body having an extremely small thickness to a molded body having a large thickness (so-called sheet-like molded body).

<Method for Manufacturing Film for Fluorine-Based Resin Adhesion>

A method for manufacturing a film for fluorine-based resin adhesion having a single layer configuration is not particularly limited, and the film can be manufactured by an inflation molding method, a T die molding method or a single layer extrusion method.

<Laminate>

In a laminate according to the present invention, an adhesive agent layer containing the above-mentioned adhesive resin composition is laminated on at least one side of a substrate.

A schematic cross sectional view of the laminate of the present invention is shown in FIG. 1. In FIG. 1, a laminate 1 comprises an adhesive agent layer 10, a fluorine-based resin film 11, and a resin film 12.

As a fluorine-based resin material for forming the fluorine-based resin film 11, polytetrafluoroethylene (PTFE), a tetrafluoroethylene-perfluoroalkyl vinyl ether copolymer (PFA), a tetrafluoroethylene-hexafluoropropylene copolymer (FEP), a tetrafluoroethylene-hexafluoropropylene-perfluoroalkyl vinyl ether (EPA), a tetrafluoroethylene-ethylene copolymer (ETFE), polyvinylidene fluoride (PVDF), polychlorofluoroethylene (PCTFE), a chlorotrifluoroethylene-ethylene copolymer (ECTFE), a mixture of one or two or more kinds of these, and the like can be used, and polychlorotrifluoroethylene (PCTFE) is preferable.

The adhesive agent layer 10 can be formed using the adhesive resin composition of the present invention.

The resin film 12 may be the same as the above-mentioned fluorine-based resin film, or may be a resin film other than this. Examples of a resin material of the resin film other than the fluorine-based resin film include polypropylene, polyethylene terephthalate, polyester, and the like.

<Method for Manufacturing Laminate>

It is preferable that the laminate of the present invention is manufactured by any one of the following methods (1) to (3) for manufacturing the laminate.

(1) A method for manufacturing the laminate, the method comprising steps of: melt-extruding a layer formed from the above-mentioned adhesive resin composition to obtain a film for fluorine-based resin adhesion having a single layer configuration; and laminating a film on both sides of the above-mentioned film for fluorine-based resin adhesion, followed by thermo-compression bonding to obtain the laminate.

(2) A method for manufacturing the laminate, the method comprising steps of: melt-extruding a layer formed from the above-mentioned adhesive resin composition on a film serving as a first substrate to obtain a laminate of first substrate/adhesive agent layer; and further laminating a second substrate so as to have first substrate/adhesive agent layer/second substrate, followed by thermo-compression bonding to obtain the laminate.

(3) A method for manufacturing the laminate, the method comprising a step of simultaneously melt extrusion-molding a resin serving as a raw material of a first substrate, the above-mentioned adhesive resin composition, and a resin serving as a raw material of a second substrate.

The laminate can be manufactured by a coextrusion method such as an inflation molding method or a T die molding method.

In the above-mentioned manufacturing method (2), when a T die molding method is used, a method such as an extrusion lamination method of extruding resin on a substrate or a sandwich lamination method of extruding resin between a substrate and a composite material may be used.

The substrate on which the adhesive resin composition of the present invention is extruded may be any of the above-mentioned fluorine-based resin material or a resin material other than the fluorine-based resin.

When the resin material other than the fluorine-based resin is used as the substrate, by setting a fluorine-based resin as a composite material to perform lamination, a film in which the resin material other than the fluorine-based resin, the adhesive agent layer, and the fluorine-based resin are laminated can be manufactured.

In the above-mentioned manufacturing method (3), when resin is extruded with a configuration of two or more layers using a coextrusion method, for example, by arranging the adhesive resin composition of the present invention on a surface layer side and setting a fluorine-based resin on a composite material side of the surface layer to perform lamination, a laminate with three or more layers having a layer configuration adjacent to the fluorine-based resin can be finally formed.

For example, when a fluorine-based resin that has a low melting point and can be melt-extruded such as an acid-modified ethylene-tetrafluoroethylene copolymer is used, the resin may be simultaneously melt-extruded as an adjacent layer of the adhesive resin composition of the present invention by a coextrusion method.

EXAMPLES

The present invention will be described in further detail below by way of Examples, but the present invention is not limited by these examples.

A component (A), a component (B), and a component (C) were mixed at a blending ratio shown in Table 1 to prepare an adhesive resin composition.

TABLE 1

|  | Component (A) | Component (B) | Component (C) |
|---|---|---|---|
| Example 1 | (A)-1 [80] | (B)-1 [20] | (C)-1 [1] |
| Example 2 | (A)-1 [70] | (B)-1 [30] | (C)-1 [1] |
| Example 3 | (A)-1 [75] | (B)-2 [25] | (C)-1 [0.75] |
| Example 4 | (A)-1 [70] | (B)-2 [30] | (C)-1 [0.7] |
| Example 5 | (A)-1 [70] | (B)-2 [30] | (C)-1 [1] |
| Example 6 | (A)-1 [65] | (B)-2 [35] | (C)-1 [1] |
| Example 7 | (A)-1 [80] | (B)-3 [20] | (C)-1 [1] |
| Example 8 | (A)-1 [70] | (B)-3 [30] | (C)-1 [1] |
| Comparative Example 1 | (A)-1 [100] | — | — |
| Comparative Example 2 | (A)-2 [100] | — | — |
| Comparative Example 3 | (A)-1 [70] | (B)-1 [30] | — |
| Comparative Example 4 | (A)-1 [50] | (B)-1 [50] | (C)-1 [1] |

Each abbreviation in Table 1 means as follows. Additionally, the numerical value in parenthesis is a blending amount (parts by mass).

(A)-1 . . . EXCELLEN GMH GH030 (metallocene-polymerized long chain branched polyethylene, $\rho=0.912$ g/cm$^3$, Tm=101° C., MFR=0.5 g/10 min (190° C., 2.16 kgf), manufactured by Sumitomo Chemical Co., Ltd.)

(A)-2 . . . Petrocene DLZ19A (epoxy group-containing low density polyethylene, $\rho=0.919$ g/cm$^3$, Tm=106° C., MFR=7 g/10 min (190° C., 2.16 kgf), manufactured by TOSOH CORPORATION)

(B)-1 . . . Kraton G1657M (styrene content 13% by mass, $\rho=0.90$ g/cm$^3$, MFR=22 g/10 min (230° C., 5 kgf), manufactured by Kraton Co., Ltd.)

(B)-2 . . . Tuftec H1221 (styrene content 12% by mass, $\rho=0.890$ g/cm$^3$, MFR=4.5 g/10 min (230° C., 2.16 kgf), manufactured by Asahi Kasei Chemicals Corporation)

(B)-3 . . . Tuftec H1062 (styrene content 18% by mass, $\rho=0.890$ g/cm$^3$, MFR=4.5 g/10 min (230° C., 2.16 kgf), manufactured by Asahi Kasei Chemicals Corporation)

(C)-1 . . . Epoxydized 1,2-polybutadiene, $\rho=0.99$ g/cm$^3$, Mn=1,000, manufactured by ADEKA CORPORATION Manufacturing Example 1

An adhesive resin composition in each of Examples 1 to 8 and Comparative Examples 1 to 4 shown in Table 1 was heated, melt-mixed, and thereafter formed into a film with a T die extruder, to manufacture a melt-mixed film having a film thickness of 50 μm as a film having a single layer of an adhesive agent layer (melt-mixed film 10).

<<Peeling Strength Measurement>>

Figure 2:
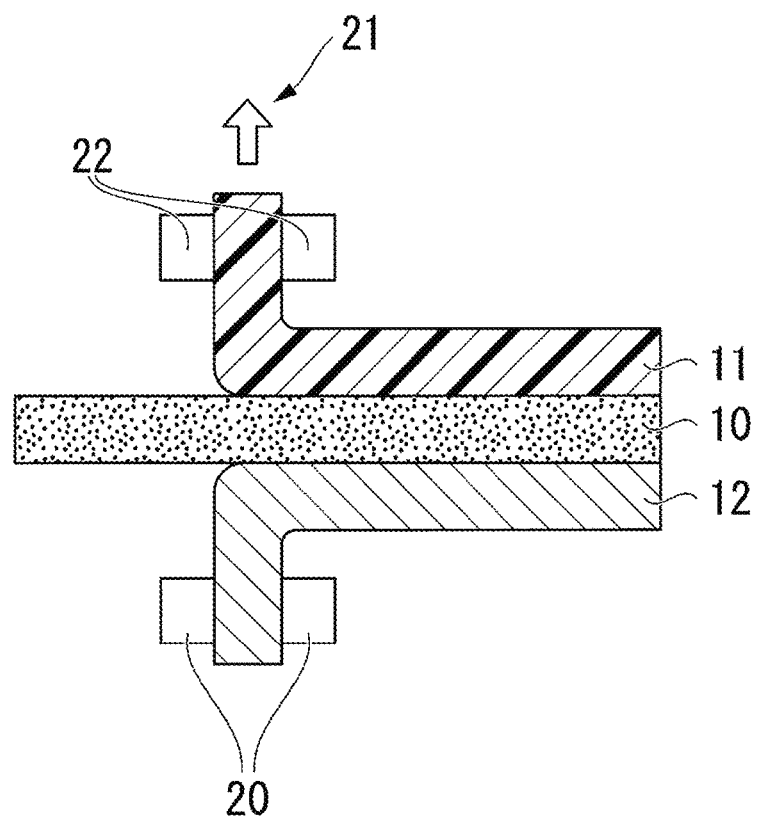
FIG. 2 is a schematic view of a tensile strength measuring device in Examples.

Peeling strength measurement will be described with reference to FIG. 2.

Using the manufactured melt-mixed film 10, each of the following laminates 1 to 4 in which three layers had been laminated in the order of the fluorine-based resin film 11, the melt-mixed film 10, and an adherend film 12 was cut into a strip form having a length of 50 mm and a width of 15 mm, and used as a test piece.

Further, the upper and lower parts of the test piece were sandwiched between PTFE sheets having a film thickness of 50 μm, and 10 mm from the end of this test piece was heat-sealed. The heat sealing conditions were a sealing temperature of 240° C., a pressure of 0.4 MPa, and a heating time of 3 seconds.

Thereafter, the upper and lower PTFE sheets were removed, and the heat-sealed test piece was held with a holding device 22 with the fluorine-based resin film 11 being on a tension side. The adherend film 12 was held with a holding device 20 to be fixed, and the fluorine-based resin film 11 was tensioned in the tensile direction shown with a reference numerical 21 to measure the peeling strength.

The measurement was performed at a tension speed of 300 mm/min and a width of 15 mm.

The fluorine-based film, the melt-mixed film, and the adherend film used in the test, and the lamination order thereof are as follows.

[Laminate]

Laminate 1: MAH-ETFE/adhesive agent layer (examination resin)/PP

Laminate 2: PCTFE/adhesive agent layer (examination resin)/PP

Laminate 3: PCTFE/adhesive agent layer (examination resin)/PCTFE

Laminate 4: PCTFE/adhesive agent layer (examination resin)/PET

Each abbreviation in the laminates 1 to 4 means as follows.

MAH-ETFE . . . Fluorine-based resin film Fluon LH-8000 ($\rho$=1.75 g/cm$^3$, Tm=180° C., MFR=4 g/10 min (230° C., 2.16 kgf), manufactured by Asahi Glass Co., Ltd.) was prepared into a 50 μm film with an extruder, and used.

PP . . . Polypropylene film SunAllomer PS522M ($\rho$=0.9 g/cm$^3$, MFR=4.9 g/10 min (230° C., 2.16 kgf) was prepared into a 50 μm film with an extruder, and used.

PCTFE . . . Polychlorotrifluoroethylene film DF0050-C1 (51 μm) (manufactured by DAIKIN INDUSTRIES, LTD.) was used.

PET . . . Polyethylene terephthalate film Polyester film E5001 (250 μm, untreated) (manufactured by TOYOBO CO., LTD.) was used.

The peeling strength and peeling appearance of the laminates 1 to 4 are shown in the following Tables 2 and 3.

TABLE 2

|  | Laminate 1 | | Laminate 2 | | Laminate 3 | |
| --- | --- | --- | --- | --- | --- | --- |
|  | Peeling strength (N/15 mm) | Peeling appearance | Peeling strength (N/15 mm) | Peeling appearance | Peeling strength (N/15 mm) | Peeling appearance |
| Example 1 | 6.92 | Interfacial peeling | 10.7 | Interfacial peeling | 15.4 | Interfacial peeling |
| Example 2 | 7.60 | Interfacial peeling | 10.9 | Interfacial peeling | 4.97 | Interfacial peeling |
| Example 3 | 9.53 | Adhesive agent layer cohesive failure | 11.7 | Adhesive agent layer cohesive failure | 6.35 | PCTFE tension side edge break |
| Example 4 | 9.45 | Adhesive agent layer cohesive failure | 10.3 | Adhesive agent layer cohesive failure | 4.87 | PCTFE tension side edge break |
| Example 5 | 10.3 | Adhesive agent layer cohesive failure | 16.4 | Interfacial peeling, PCTFE side edge break | 10.8 | PCTFE tension side edge break |
| Example 6 | 9.92 | Adhesive agent layer cohesive failure | 9.08 | Interfacial peeling | 8.60 | Adhesive agent layer cohesive failure |
| Example 7 | 7.55 | Interfacial peeling | 9.28 | Interfacial peeling, PCTFE side edge break | 10.0 | Interfacial peeling |
| Example 8 | 9.22 | Interfacial peeling | 13.6 | Interfacial peeling, PCTFE side edge break | 6.54 | Adhesive agent layer cohesive failure |
| Comparative Example 1 | 1.30 | Interfacial peeling | 0.68 | Interfacial peeling | 0.31 | Interfacial peeling |
| Comparative Example 2 | 2.96 | Interfacial peeling | 1.70 | Interfacial peeling | 0.86 | Interfacial peeling |
| Comparative Example 3 | 4.06 | Interfacial peeling | 1.28 | Interfacial peeling | 1.83 | Interfacial peeling |
| Comparative Example 4 | Processability is bad, and it is impossible to prepare a film having a single layer of an adhesive agent layer. | | | | | |

TABLE 3

| | Laminate 4 | |
|---|---|---|
| | Peeling strength (N/15 mm) | Peeling appearance |
| Example 1 | 4.67 | Interfacial peeling |
| Example 2 | 6.81 | Interfacial peeling |
| Example 3 | 9.67 | Interfacial peeling, adhesive agent layer cohesive failure |
| Example 4 | 15.3 | Interfacial peeling |
| Example 5 | 5.56 | Interfacial peeling |
| Example 6 | 12.2 | Interfacial peeling, PCTFE side edge break |
| Example 7 | 6.21 | Interfacial peeling |
| Example 8 | 8.74 | Interfacial peeling |
| Comparative Example 1 | 0.94 | Interfacial peeling |
| Comparative Example 2 | Evaluation is impossible due to much unevenness in thickness. | |
| Comparative Example 3 | Evaluation is impossible due to much unevenness in thickness. | |
| Comparative Example 4 | 2.88 | Interfacial peeling |

From the results described in the above-mentioned Table 2 and Table 3, it could be confirmed that in Examples 1 to 8 to which the present invention was applied, the adhesion strength was improved by mixing the polyethylene-based resin, the styrene-based elastomer, and the epoxydized polybutadiene at a predetermined blending region.

To the contrary, in Comparative Example 1 to which the present invention was not applied, the laminate was not bonded not only to the fluorine-based resin, but also to polypropylene, so that this resulted in extremely low peeling strength.

Furthermore, in Comparative Example 3 to which the present invention was not applied and in which epoxydized polybutadiene was not blended, the adhesion strength was greatly reduced as compared with Example 2 to which the present invention was applied.

Furthermore, Comparative Example 2 in which an epoxy group-containing polyethylene was used showed that the peeling strength was high as compared with Comparative Example 1 of a polyethylene single material and the peeling strength between PCTFE/PET was also high, but Comparative Example 2 comprehensively fell short of the present invention including the styrene-based elastomer.

Comparative Example 4 to which the present invention was not applied gave the result that the peeling strength between MAH-ETFE/PP and between PCTFE/PET was weak.

Manufacturing Example 2

A PCTFE resin (manufactured by DAIKIN INDUSTRIES, LTD.) as a resin to be a raw material of a first substrate, the above-mentioned adhesive resin composition described in Example 1 of Table 1, and a polypropylene (SunAllomer PS522M) as a resin to be a raw material of a second substrate were each separately heated and melt-mixed. The resulting mixture was formed into a film by performing simultaneous multilayer film formation with use of an extruder capable of performing simultaneous multilayer extrusion molding, to obtain a laminated film having a three-layer configuration of PCTFE (50 μm)/adhesive agent layer (20 μm)/PP (50 μm).

In the resulting laminated film, the adhesion strength between respective layers was very good, and the flatness was also good.

Manufacturing Example 3

The above-mentioned adhesive resin composition described in Example 1 of Table 1 was melted and kneaded, a film was formed on a 100 μm PET film as a first substrate layer with use of a T die such that an adhesive agent layer had a thickness of 30 μm, to obtain a laminate comprising a PET/adhesive agent layer. A 51 μm PCTFE resin film (manufactured by DAIKIN INDUSTRIES, LTD.) as a second substrate layer was laminated on the resulting laminate, followed by thermo-compression bonding at a temperature of 240° C. and a pressure of 0.4 MPa for a heating time of 3 seconds, to obtain a laminate having a three-layer configuration of PET (100 μm)/adhesive agent layer (30 μm)/PCTFE (51 μm).

In the resulting laminated film, the adhesion strength between respective layers was very good, and the flatness was also good.

What is claimed is:

1. An adhesive resin composition for use in adhesion of a fluorine-based resin, the composition comprising a polyethylene-based resin, an elastomer component, and a component having an epoxy group and a vinyl group, wherein
   a content of said polyethylene-based resin is 55 parts by mass or more and 90 parts by mass or less,
   a content of said elastomer component is 10 parts by mass or more and 45 parts by mass or less,
   a content of said component having an epoxy group and a vinyl group based on a total amount of 100 parts by mass of said polyethylene-based resin and said elastomer component is 0.1 parts by mass or more and 1.5 parts by mass or less,
   said elastomer component is a styrene-ethylene-butylene-styrene copolymer having a styrene content of 8% by mass or more and 24% by mass or less, and
   said component having an epoxy group and a vinyl group is a component having an epoxy group partially introduced into 1,2-polybutadiene, and has a number average molecular weight of 500 or more and 4,000 or less.

2. The adhesive resin composition according to claim 1, wherein said polyethylene-based resin is a polyethylene polymerized with a metallocene-based catalyst.

3. A film for fluorine-based resin adhesion having a single layer configuration, wherein said film is formed from the adhesive resin composition according to claim 1.

4. A laminate having a layer formed from the adhesive resin composition according to claim 1.

5. A method for manufacturing the laminate according to claim 4, the method being any one of methods (1) to (3) below:
   (1) a method for manufacturing the laminate, the method comprising steps of:
      melt-extruding the layer formed from said adhesive resin composition to obtain a film for fluorine-based resin adhesion having a single layer configuration; and
      laminating a film on both sides of said film for fluorine-based resin adhesion, followed by thermo-compression bonding to obtain the laminate;
   (2) a method for manufacturing the laminate, the method comprising steps of:
      melt-extruding the layer formed from said adhesive resin composition on a film serving as a first substrate to obtain a laminate of first substrate/adhesive agent layer; and further laminating a second substrate so as to have first substrate/adhesive agent layer/second substrate, followed by thermo-compression bonding to obtain the laminate; and (3) a method for manufacturing the laminate, the method comprising a step of simultaneously melt extrusion-molding a resin serving as a raw material of a first substrate, said adhesive resin composition, and a resin serving as a raw material of a second substrate.

* * * * *